United States Patent [19]

Suzuki

[11] Patent Number: 5,160,002
[45] Date of Patent: Nov. 3, 1992

[54] SYSTEM AND METHOD FOR ADAPTIVE LOCK-UP CONTROL

[75] Inventor: Yutaka Suzuki, Kanagawa, Japan

[73] Assignee: Nissan Motor Co., Ltd., Yokohama, Japan

[21] Appl. No.: 681,673

[22] Filed: Nov. 3, 1991

[30] Foreign Application Priority Data

Apr. 6, 1990 [JP] Japan .................................. 2-92667

[51] Int. Cl.$^5$ .............................................. F16D 33/16
[52] U.S. Cl. .................... 192/3.31; 192/0.052; 192/0.096
[58] Field of Search ............... 192/0.033, 0.076, 0.096, 192/3.31, 3.33, 103 F; 74/890; 475/69

[56] References Cited

U.S. PATENT DOCUMENTS

| | | | |
|---|---|---|---|
| 3,966,032 | 6/1976 | Koivunen | 192/3.31 X |
| 4,428,467 | 1/1984 | Hiramatsu | 192/0.076 X |
| 4,518,068 | 5/1985 | Oguma et al. | 192/0.052 |
| 4,660,697 | 4/1987 | Yoneda et al. | 192/0.033 |
| 4,664,235 | 5/1987 | Yokoyama | 192/0.033 X |
| 4,722,429 | 2/1988 | Kono | 192/0.076 X |
| 4,724,939 | 2/1988 | Lockhart et al. | 192/3.31 |
| 4,735,113 | 4/1988 | Yamamuro et al. | 74/866 |
| 4,757,889 | 7/1988 | Brown et al. | 192/3.31 X |
| 4,781,279 | 11/1988 | Georg | 192/3.31 X |
| 4,843,918 | 7/1989 | Morimoto | 192/3.31 X |
| 4,876,922 | 10/1989 | Koshimo | 192/3.33 X |
| 4,880,094 | 11/1989 | Ohkumo | 192/0.076 X |
| 4,957,194 | 9/1990 | Sawa et al. | 192/0.096 |
| 5,010,990 | 4/1991 | Yoshimura et al. | 192/3.31 X |

FOREIGN PATENT DOCUMENTS

| | | |
|---|---|---|
| 0180209 | 5/1986 | European Pat. Off. . |
| 4025455 | 3/1991 | Fed. Rep. of Germany . |
| 58-94667 | 6/1983 | Japan . |
| 59-280159 | 12/1984 | Japan .................................. 192/0.096 |
| 60-1460 | 1/1985 | Japan .................................. 192/3.31 |
| 60-49160 | 3/1985 | Japan .................................. 192/3.31 |
| 60-143266 | 7/1985 | Japan .................................. 192/3.31 |
| 61-193933 | 8/1986 | Japan .................................. 192/0.096 |
| 63-172058 | 7/1988 | Japan . |

OTHER PUBLICATIONS

Voight, "Basic Problems and Basic Strategies of Adaption Processes", No. 5, pp. 160–161, Mar. 1976.
Martin et al., "Adaptive Systems–Definition and Classification", No. 12, pp. 429–430, Mar. 1976.
"ABC of Technology and Natural Science", vol. 2, p. 957.

Primary Examiner—Leslie A. Braun
Assistant Examiner—Nicholas Whitelaw
Attorney, Agent, or Firm—Foley & Lardner

[57] ABSTRACT

An adaptive control of a lock-up clutch is disclosed. An initial value of an operating signal on which an electric actuator for the lock-up clutch operates is modified based on a deviation of a lag or delay from a target timer interval such that the initial value is increased when the lag is longer than the target time interval, while it is decreased when the lag is shorter than the target time interval.

7 Claims, 6 Drawing Sheets

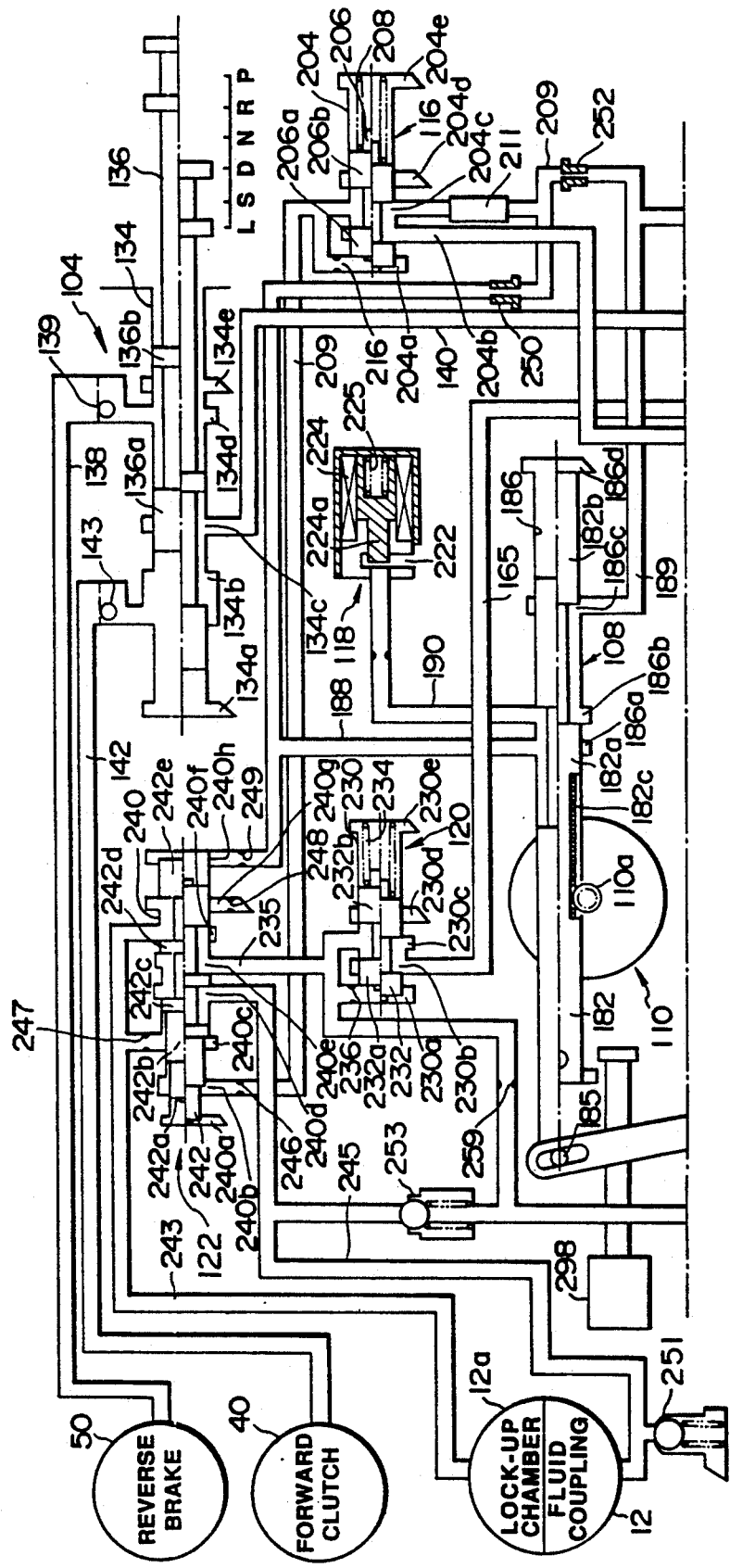

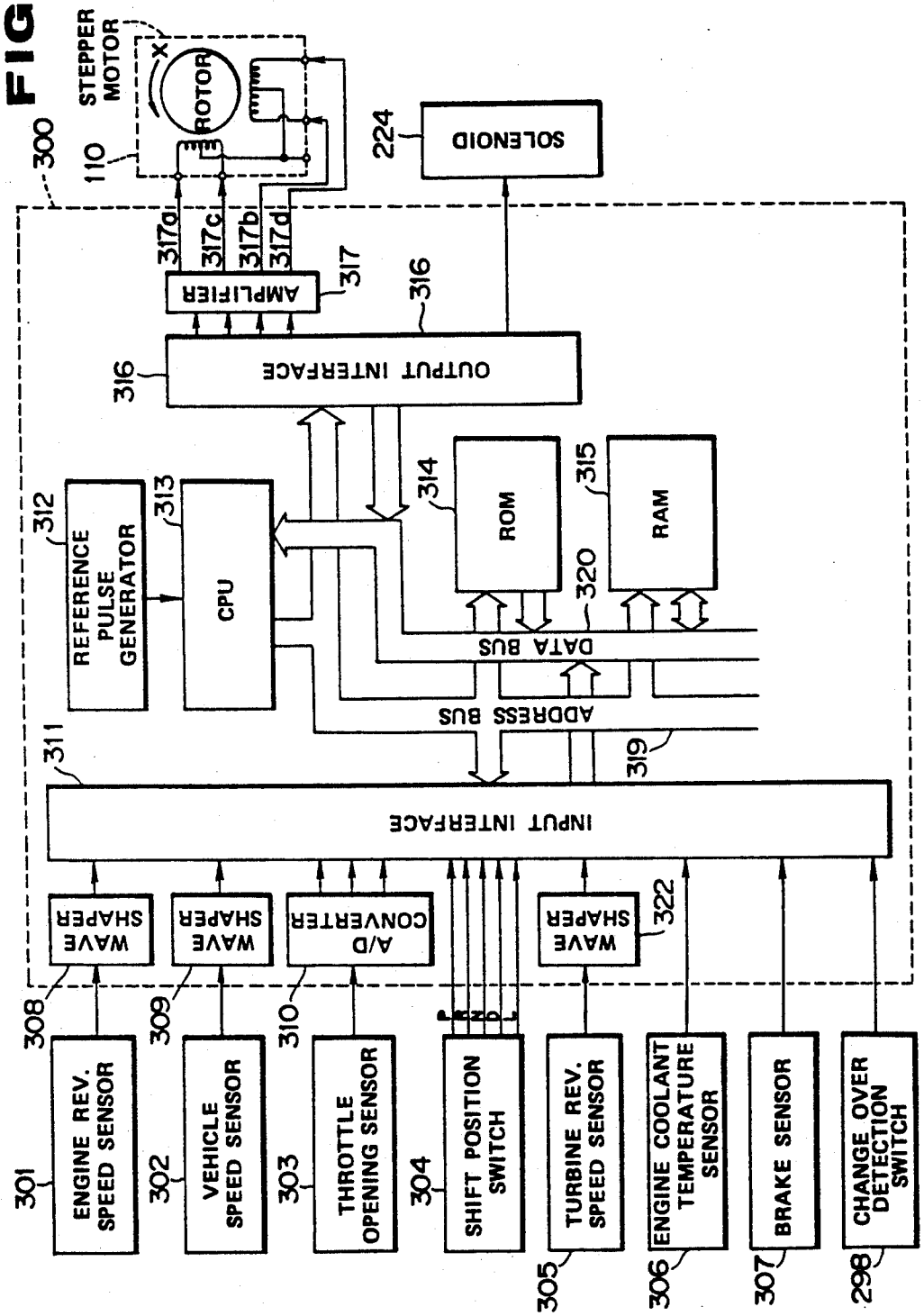

SYSTEM AND METHOD FOR ADAPTIVE LOCK-UP CONTROL

RELATED APPLICATIONS

U.S. patent application Ser. No. 07/681,675 claiming priority on Japanese Patent Application No. 2-92668 filed on Apr. 6, 1990; and U.S. patent application Ser. No. 07/681,674 claiming priority on Japanese Patent Application No. 2-92669 filed on Apr. 6, 1990:

BACKGROUND OF THE INVENTION

The present invention relates to a system and a method for adaptive control of a lock-up clutch in a hydrokinetic torque transmitting unit.

Japanese Patent Application First Publication (unexamined) No. 63-172058 discloses a system for a control of a lock-up clutch in a hydrokinetic torque transmitting unit including a pump impeller, and a turbine runner. When it is engaged, the lock-up clutch connects the turbine runner to the pump impeller. The system comprises an electro-hydraulic circuit, including an electric actuator in the form of a lock-up solenoid, for hydraulically controlling engagement of the lock-up clutch, and a control unit for generating an operating signal supplied to the electric actuator. The duty of the lock-up solenoid is varied by the operating signal generated by the control unit. When duty of the lock-up solenoid is zero, the lock-up clutch is released. After the control unit starts generating the operating signal, the duty of the lock-up solenoid gradually increases since the operating signal is indicative of the duty determined in the control unit. After a time interval, engagement of the lock-up clutch is initiated, and when the duty attains a predetermined value, the lock-up clutch is fully engaged. Describing this process of engagement in other words, a slip in the hydrokinetic torque transmitting unit starts decreasing after the initial engagement of the lock-up clutch.

The present invention aims at improving a control of a lock-up clutch in a hydrokinetic torque transmitting unit such that a lag or delay before initial engagement of the lock-up clutch is kept at a target value. Thus, a variation in the lag owing to product to product variability or a change in temperature of hydraulic fluid is eliminated or minimized. If the lag is too long, baking of the lock-up clutch results, while if the lag is too short, a considerable shock results upon engagement of the lock-up clutch.

Therefore, an object of the present invention is to provide a system and a method for an adaptive control of a lock-up clutch in a hydrokinetic torque transmitting unit to compensate for a variation in lag owing to product to product variability, aging, a change in temperature of hydraulic fluid, and etc.

SUMMARY OF THE INVENTION

According to one aspect of the present invention, there is provided a system for an adaptive control of a lock-up clutch in a hydrokinetic torque transmitting unit including a pump impeller coupled with an engine, and a turbine runner, the lock-up clutch being engageable to connect the turbine runner to the pump impeller, the system comprising:

means, including an electric actuator, for controlling engagement of the lock-up clutch;

means for generating an operating signal supplied to said electric actuator, said operating signal including an initial value and a term related to a difference between an actual slip in the hydrokinetic torque transmitting unit and a target slip, wherein, during engagement of the lock-up clutch, an actual lag before initial engagement of the lock-up clutch is determined, and a deviation of said actual lag from a target time interval is determined, and said initial value is modified in such a direction as to decrease said deviation toward zero.

According to another aspect of the present invention, there is provided a method for an adaptive control of a lock-up clutch in a hydrokinetic torque transmitting unit including a pump impeller coupled with an engine, and a turbine runner, the lock-up clutch being engageable to connect the turbine runner to the pump impeller, the method comprising the steps of:

controlling engagement of the lock-up clutch in response to an operating signal;

determining an actual slip in the hydrokinetic torque transmitting unit;

generating said operating signal, said operating signal including an initial value and a term related to a difference between said actual slip and a target slip, wherein, during engagement of the lock-up clutch, a time interval from a first instant when said generating step starts generating said operating signal to a second instant when said actual slip starts changing is determined, and a deviation of said time interval determined from a target time interval is determined, and said initial value is modified in such a direction as to decrease said deviation toward zero.

BRIEF DESCRIPTION OF THE DRAWINGS

FIGS. 2A and 2B, when combined, illustrate an electro-hydraulic circuit for the automatic transmission;

FIG. 3 is a block diagram of a control unit for the electro-hydraulic circuit;

DETAILED DESCRIPTION OF THE INVENTION

Referring to FIGS. 1, 2A, 2B, and 3, reference is made to U.S. Pat. No. 4,735,113 issued to Yamamuro et al., on Apr. 5, 1988 which is hereby incorporated by reference in its entirety. Specifically, reference should be made to FIG. 2, 1A, 1B, and 3 of this known patent since they correspond to FIGS. 1, 2A, 2B, and 3 of this application. This United States Patent corresponds to EP-A 0180209 published on May 7, 1986, which EP publication is hereby incorporated by reference in its entirety. In understanding FIGS. 1, 2A, 2B, and 3, reference is also made to copending U.S. patent application Ser. No. 07/563,309 filed by Yutaka SUZUKI (the same applicant as this application) on Aug. 7, 1990, which Application is hereby incorporated by reference in its entirety. This copending United States Patent Application corresponds to German Patent Application Serial No. P 4025455.0 filed on Aug. 10, 1990, now DE 40 25 455 A1 published on Mar. 14, 1991.

Figure 1:
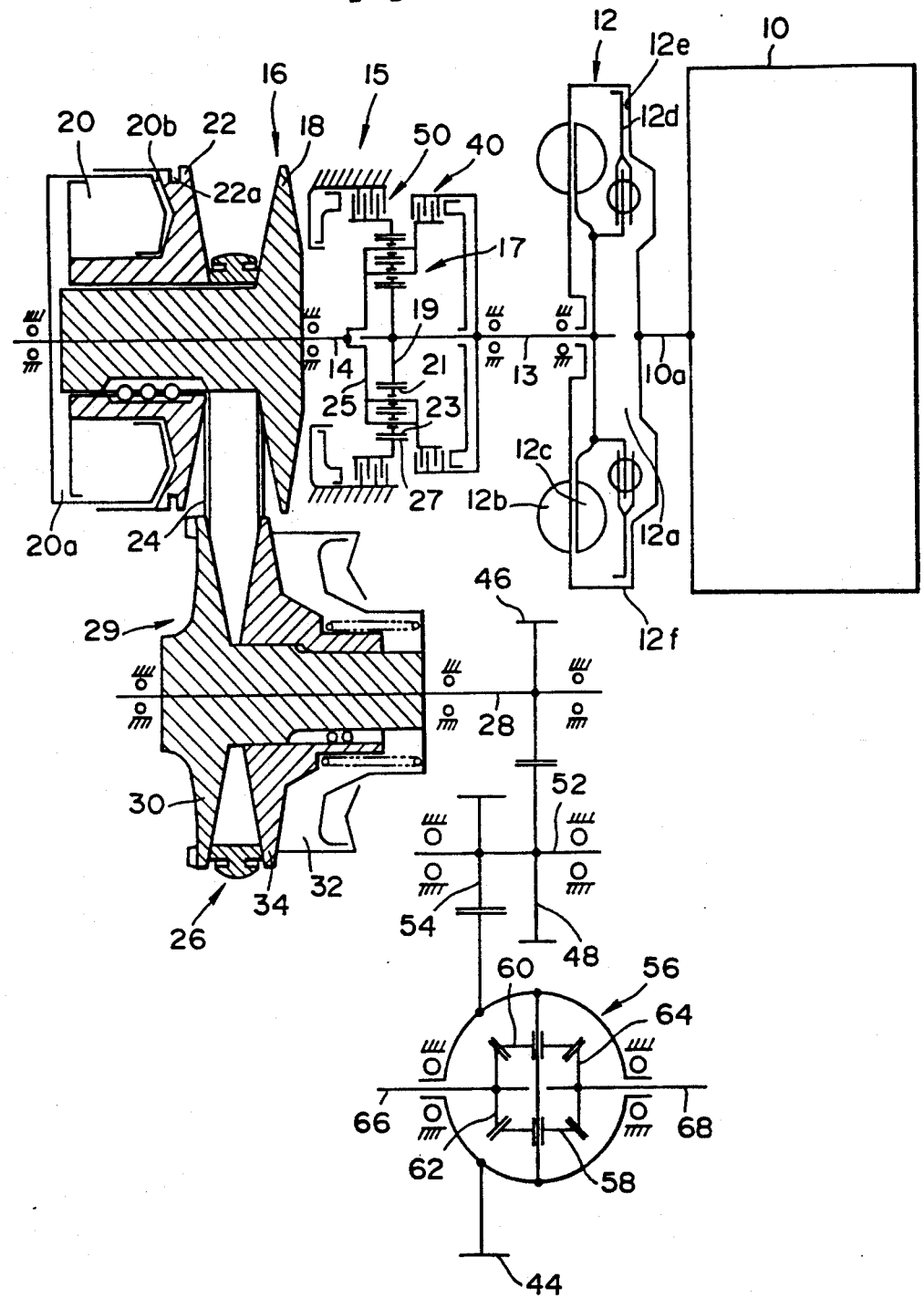
FIG. 1 a schematic diagram of a motor vehicle with an engine followed by a hydrokinetic torque transmitting unit with a lock-up clutch and an automatic transmission.

Referring to FIG. 1, a motor vehicle includes an engine 10 with a throttle which opens in degrees as an accelerator pedal or a gas pedal is depressed, a hydrokinetic torque transmitting unit 12 in the form of a fluid coupling 12, a forward/reverse drive change-over mechanism 15, a V-belt pulley unit 16, 26, and a differential 56. The fluid coupling 12 includes a pump impeller 12b coupled with the engine 10 at its output shaft 10a, a turbine runner 12c coupled with a turbine shaft 13 which is in turn coupled with the forward/reverse drive change-over mechanism 15. The fluid coupling 12 includes a lock-up mechanism, namely, a lock-up clutch, which is hydraulically operated. When the lock-up clutch is engaged, the lock-up mechanism assumes a lock-up state where the pump impeller 12b is mechanically connected to the turbine runner 12c, while, when the lock-up clutch is released, it assumes a release state where the pump impeller 12b is fluidly connected to the turbine runner 12c. The lock-up clutch includes a friction clutch element 12d rotatable with the turbine runner 12c. The clutch element 12d divides the inside of the fluid coupling 12 into two chambers, including a lock-up fluid chamber 12a, on the opposite sides thereof.

The position of parts illustrated in FIG. 1 shows the lock-up mechanism assuming the release state when hydraulic fluid is supplied to the lock-up chamber 12a. The hydraulic fluid is allowed to pass through a clearance 12f formed around the outer periphery of the clutch element 12d to flow into the inside of the fluid coupling 12, i.e., a torous circuit formed by the pump impeller 12b and the turbine runner 12c. When hydraulic fluid is discharged from the lock-up chamber 12a and hydraulic fluid is supplied directly into the inside of the fluid coupling 12, there occurs a pressure difference across the clutch element 12d urging same into engagement with the adjacent wall 12e rotatable with the pump impeller 12b.

Figure 2B:
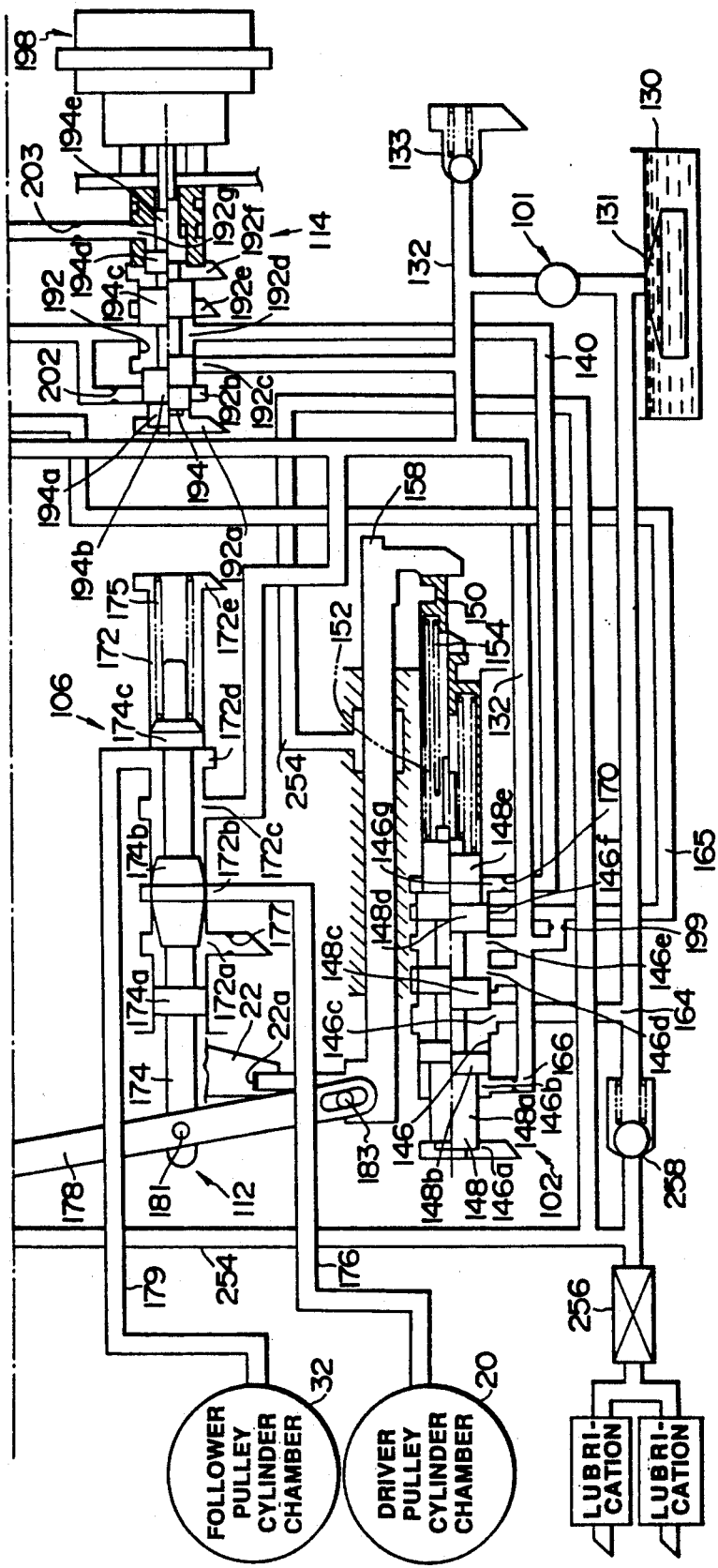

Referring to FIGS. 2A and 2B, a lock-up control valve 122, an electric actuator in the form of an electromagnetically operated valve 118 including a solenoid 224, a throttle valve 114, and a shift command valve 108 are shown. The lock-up control valve 122 has a lock-up position as illustrated by an upper half thereof viewing in FIG. 2A and a lock-up release position as illustrated by a lower half thereof viewing in FIG. 2A. It assumes one of the two positions under the control of the electromagnetically operated valve 118. The throttle valve 114 generates a throttle pressure which is supplied to a forward clutch 40 for a forward drive or a reverse brake 50 for a reverse drive. The magnitude of the throttle pressure is adjustable or variable by the electromagnetically operated valve 118. The electromagnetically operated valve 118 is connected to the lock-up control valve 122 or the throttle valve 114, selectively, under the control of the shift command valve 108. The shift command valve 108 has a spool 182 longitudinally movable by a shift motor 110 in the form of a stepper motor. The stepper motor 110 and the solenoid 224 of the electromagnetically operated valve 118 are under the control of a microcomputer based control unit 300 shown in FIG. 3. The spool 182 is movable within a normal stroke range between a minimum reduction ratio position and also movable beyond the maximum reduction ratio position into an overstroke range next adjacent to the normal stroke range. The spool 182 is formed with two axially spaced lands 182a and 182b which function to connect the electromagnetically operated valve 118 to the lock-up control valve 122 to subject the lock-up control valve 122 to a hydraulic pressure signal generated by the electromagnetically operated valve 118 during movement of the spool 182 within the normal stroke range and disconnect the electromagnetically operated valve 118 from the lock-up control valve 122 during movement of the spool within the overstroke range. During movement of the spool 182 within the normal stroke range, the lands 182a and 182b on the spool 182 function to disconnect the electromagnetically operated valve 118 from the throttle valve 114, while during movement of the spool 182 within the overstroke range, the lands 182a and 182b on the spool 182 function to connect the electromagnetically operated valve 118 to the throttle valve 114. A constant pressure regulator valve 116 generates a constant hydraulic pressure. This constant hydraulic pressure is allowed to act via a signal pressure port 240b on the lock-up control valve 122 when the electromagnetically operated valve 118 is disconnected from the lock-up control valve 122 during the movement of the spool 182 within the overstroke range to keep the lock-up control valve 122 at the lock-up release position, causing the lock-up mechanism of the fluid coupling 12 to assume the lock-up release state. Upon or immediately after a driver's demand for moving the motor vehicle from a standstill, the spool 182 of the shift command valve 108 moves from the overstroke range to the maximum reduction ratio position of the normal stroke range to connect the electromagnetically operated valve 118 to the lock-up control valve 122. Subsequently, the lock-up control valve 122 is allowed to shift between the lock-up release position and the lock-up position under the control of the electromagnetically operated valve 118. The electromagnetically operated valve 118 holds the lock-up control valve 122 in the lock-up release position until the vehicle speed exceeds a lock-up vehicle speed value, and subsequently shifts the lock-up control valve 122 to the lock-up position when the vehicle speed exceeds the lock-up vehicle speed value.

The duty of the solenoid 224 of the electromagnetically operated valve 118 is controlled by an operating signal supplied thereto from the control unit 300. When the duty of the solenoid 224 is 0%, the electromagnetically operated valve 118 blocks fluid communication between a fluid conduit 190 and a drain port 222, allowing the constant hydraulic fluid pressure generated by the constant pressure regulator valve 116 to act on and hold the lock-up control valve 122 at the lock-up release position as illustrated by the lower half thereof viewing in FIG. 2A. When the duty of the solenoid 224 is 100% or a predetermined sufficiently high value adjacent to 100%, the electromagnetically operated valve 118 allows discharge of hydraulic fluid from the hydraulic conduit 190, allowing the lock-up control valve 122 to assume the lock-up position as illustrated by the upper half thereof viewing in FIG. 2A.

Figure 7:
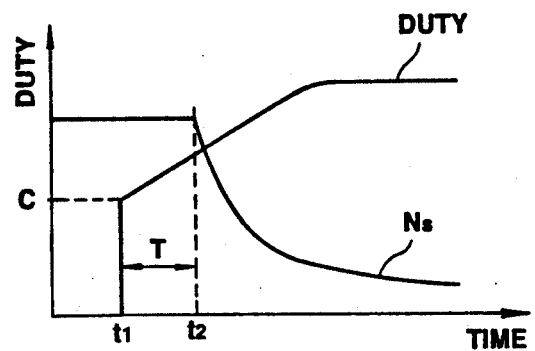
FIG. 7 is a timing diagram showing a variation of a slip (Ns) in the hydrokinetic torque transmitting unit against a schedule of increase in duty (DUTY) of an electric actuator in the form of a solenoid for the lock-up clutch control.

For shockless engagement of the lock-up mechanism, the duty of the solenoid 224 is increased to an initial value C at an instant $t_1$ when the vehicle speed becomes greater than the lock-up vehicle speed value and subsequently increased gradually till the predetermined value mentioned above as shown by the fully drawn line denoted DUTY in FIG. 7. In FIG. 7, the initial engagement of the lock-up mechanism is denoted by an instant $t_2$.

The operating signal supplied to the solenoid 224 from the control unit 300 instructs the solenoid 224 to assume the duty determined in the control unit 300. As shown in FIG. 3, the control unit 300 receive signals from an engine revolution speed sensor 301, a vehicle speed sensor 302, a throttle opening degree sensor 303, and a turbine revolution speed sensor 305. The engine revolution speed sensor 301 detects a revolution speed of the engine 10 and generates an engine revolution speed indicative signal indicative of the engine revolution speed detected. The vehicle speed sensor 302 detects a vehicle speed of the motor vehicle and generates a vehicle speed indicative signal indicative of the vehicle speed detected. The throttle opening degree sensor 303 detects an opening degree of the engine throttle, as a variable representative of the engine load, and generates a throttle opening degree indicative signal indicative of the throttle opening degree detected. The turbine revolution speed sensor 305 detects a revolution speed of the turbine shaft 13 and generates a turbine revolution speed indicative signal indicative of the turbine revolution speed detected. These signals are fed to the control unit 300 and used upon executing the program shown in FIG. 4. In the control unit 300, the execution of the timer program shown in FIG. 5 is repeated at a predetermined time interval of, for example, 1 msec. Thus, the content of a timer T is incremented by one at a step 140.

Figure 4:
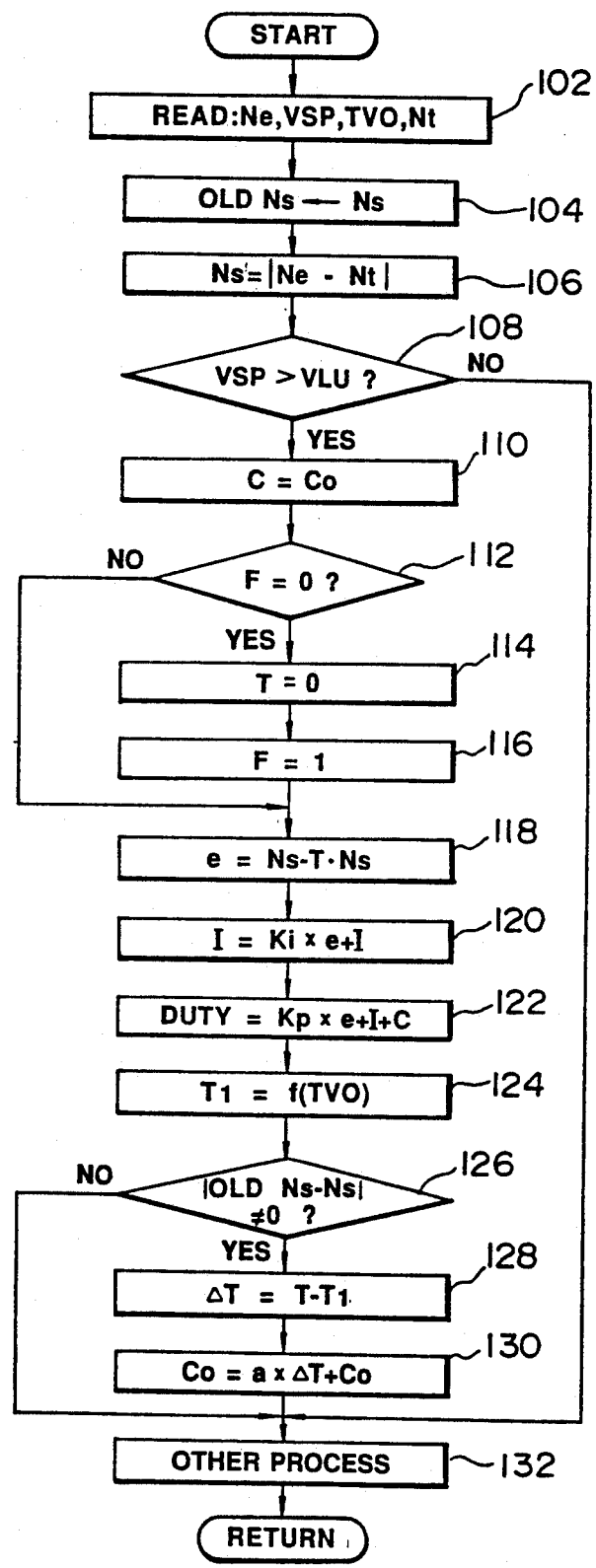
FIG. 4 is a flow diagram of a control program stored in a memory of the control unit.
Figure 5:
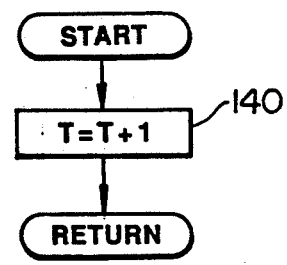
FIG. 5 is a flow diagram of a program for incrementing a timer.

In order to adaptively correct a lag which tends to vary owing to product to product variability or a change in temperature in hydraulic fluid, the control unit 300 executes the program shown in FIG. 4. The execution of this program is repeated at a predetermined interval, for example, 1 msec. The lag or delay is used to mean a time interval from the instant $t_1$ (see FIG. 7) when the control unit 300 starts generating the operating signal supplied to the solenoid 224 to the instant $t_2$ (see FIG. 7) when the lock-up mechanism starts engaging. The instant $t_2$ is determined when a slip in the fluid coupling 12 starts decreasing. With execution of the program shown in FIG. 4, the lag T (see FIG. 7) is corrected and kept at a target time interval $T_1$ which is determined by a table look-up operation of FIG. 6 using a throttle opening degree data TVO.

In FIG. 4, reading operation is performed at a step 102 to store an engine revolution speed data Ne, a vehicle speed data VSP, a throttle opening degree data TVO, and a turbine revolution speed data Nt which are derived from the signals of the corresponding sensors 301, 302, 303, and 305. A slip data Ns stored after calculation in the last cycle of run is set as an old slip data OLD Ns at a step 104. Subsequently, the slip data Ns is updated at a step 106 by calculating an absolute difference between the engine revolution speed data Ne and the turbine revolution speed data Nt stored at the step 102. The program proceeds to a decision step 108 where it is determined whether the vehicle speed data VSP is greater than a predetermined lock-up vehicle speed value VLU or not. If the inquiry at the step 108 results in negative, the program proceeds to a block 132 where the other process is performed. If the inquiry at the step 108 results in affirmative, the program proceeds to a step 110 where a data $C_0$ is set as the initial value C, and then to a decision step 112 where it is determined whether a lock-up in progress flag F is reset or not. This flag F is reset before the vehicle speed data VSP becomes greater than the lock-up vehicle speed value VLU. Thus, the inquiry at the step 112 results in affirmative and the program proceeds to steps 114 and 116 where the timer T is reset and the flag F is set, respectively. These steps 114 and 116 are passed in the next cycle since the inquiry at the step 112 results in negative to allow the program to jump to a step 118. After the step 116, the program proceeds to the step 118 where a difference data e is given by calculating a difference between the slip data Ns and a target slip value T·Ns. Following this step 118, an integral term I is incremented by a product of Ki×e (where: Ki is an integral gain) at a step 120. Following this step 120, the program proceeds to a step 122 where a duty data DUTY is updated by calculating the following equation:

$$DUTY = Kp \times e + I + C$$

where: Kp is a proportional gain. From this equation, it will be appreciated that the duty (DUTY) includes the initial value (C) and a term (Kp×e+I) related to the difference (e). The duty data DUTY is outputted to the solenoid 224 in the form of the operating signal supplied from the control unit 300.

Figure 6:
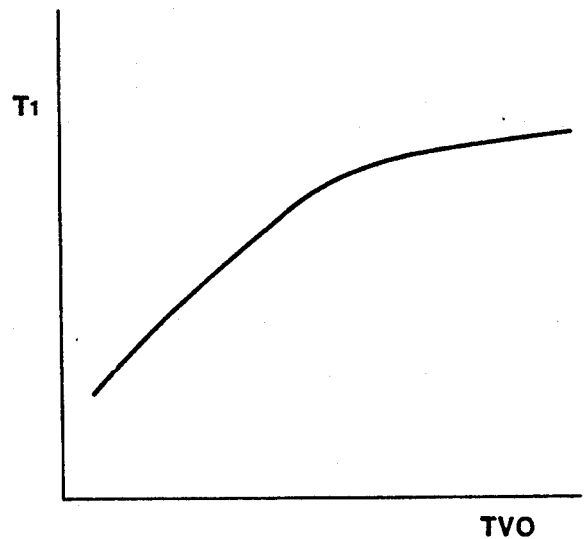
FIG. 6 is a graph illustrating a function $T_1 = f(TVO)$, where $T_1$: a target time interval, and TVO: a throttle opening degree representative of an engine load.

After the step 122, the program proceeds to a step 124 where a table look-up operation of FIG. 6 is performed using the throttle opening degree data TVO to obtain a target time interval $T_1$. Following this step, the program proceeds to a decision step 126 where it is determined whether the absolute value of the difference between the old slip data OLD Ns and the newly stored slip data Ns fails to be zero or not. Since the slip in the fluid coupling 12 remains invariable till the initial engagement of the lock-up mechanism, the inquiry at the decision step 126 results in negative and the program passes steps 128 and 130 and jumps to the block 132. Upon the initial engagement of the lock-up mechanism at the instant $t_2$, the slip in the fluid coupling 12 starts decreasing as illustrated by the fully drawn curve Ns in FIG. 7. At the instant $t_2$, the inquiry at the step 126 result in affirmative since the absolute value of the difference fails to be zero. Thus, the program proceeds to steps 128 and 130. At the step 128, a deviation of the content of the timer T from the target time interval $T_1$ is calculated and stored as delta T. At the next step 130, the data $C_0$ is modified by a x delta T, where: a is a constant. Since this updated data $C_0$ is stored as the initial value C at the step 110 when calculating the duty data DUTY in the subsequent cycle, the initial value is adaptively corrected in such a direction as to decrease the deviation delta T toward zero.

From the steps 128 and 130, it will be appreciated that when the lag which is represented by T is greater than the target time interval $T_1$, the initial value C is increased, while when it is less than the target time interval $T_1$, the initial value C is decreased. The lag decreases if the initial value C is increased, while it increases if the initial value C is decreased.

What is claimed is:

1. A system for an adaptive control of a lock-up clutch in a hydrokinetic torque transmitting unit including a pump impeller coupled with an engine, and a turbine runner, the lock-up clutch being engageable to connect the turbine runner to the pump impeller, the system comprising:

means for generating an operating signal, said operating signal including an initial value and a term related to a difference between an actual slip in the hydrokinetic torque transmitting unit and a target slip;

means, including an electric actuator, for controlling engagement of the lock-up clutch in response to said operating signal, wherein, during occurrence of engagement of the lock-up clutch, an actual lag before initial engagement of the lock-up clutch is determined, and a deviation of said actual lag from a target time interval is determined, said initial value being modified in response to said deviation in such a direction so that a subsequent occurrence of engagement of the lock-up clutch using a modified initial value results in a reduction in said deviation.

2. A system as claimed in claim 1, wherein said actual lag is represented by a time interval from a first instant when said generating means starts generating said operating signal to a second instant when said actual slip starts changing.

3. A system as claimed in claim 2, wherein when said time interval is greater than said target time interval, said initial value is increased, while when said time interval is less than said target time interval, said initial value is decreased.

4. A system as claimed in claim 3, wherein said target time interval is set as a function of a load on the engine.

5. A method for an adaptive control of a lock-up clutch in a hydrokinetic torque transmitting unit including a pump impeller coupled with an engine, and a turbine runner, the lock-up clutch being engageable to connect the turbine runner to the pump impeller, the method comprising the steps of:

controlling engagement of the lock-up clutch in response to an operating signal;

determining an actual slip in the hydrokinetic torque transmitting unit;

generating said operating signal, said operating signal including an initial value and a term related to a difference between said actual slip and a target slip;

determining a target time interval;

determining an actual time interval from a first instant when said generating step starts generating said operating signal to a second instant when said actual slip starts changing during occurrence of engagement of the lock-up clutch;

calculating a deviation of said actual time interval from said target time interval; and modifying said initial value in response to said deviation in such a direction so that a subsequent occurrence of engagement of the lock-up clutch using a modified initial value results in a reduction in said deviation.

6. A system for an adaptive control of a lock-up clutch in a hydrokinetic torque transmitting unit including a pump impeller coupled with an engine of a motor vehicle, and a turbine runner, the lock-up clutch being engageable to connect the turbine runner to the pump impeller, the system comprising:

means for detecting a revolution speed of the engine and generating an engine revolution speed indicative signal indicative of said revolution speed of the engine detected;

means for detecting a revolution speed of the turbine runner and generating a turbine revolution speed indicative signal indicative of said revolution speed of the turbine runner detected;

means for detecting a vehicle speed of the motor vehicle and generating a vehicle speed indicative signal indicative of said vehicle speed detected;

a control unit including, means for deriving an actual slip from said engine revolution speed indicative signal and said turbine revolution speed indicative signal and generating an actual slip indicative signal indicative of said actual slip derived;

means for generating an operating signal, said operating signal including an initial value and a term related to a difference between said actual slip indicative signal and a target slip value, said operation signal being generated after said vehicle speed indicative signal has exceeded a predetermined lock-up vehicle speed value;

means for calculating a first time derivative of said actual slip indicative signal and generating a first time derivative indicative signal indicative of said first time derivative calculated;

means for determining whether said first time derivative indicative signal fulfills a predetermined condition;

means for counting a time elapsed after said vehicle speed indicative signal has exceeded said predetermined lock-up vehicle speed value until determination that said first time derivative indicative signal fulfills said predetermined condition and generating a time interval indicative signal indicative of said time counted;

means for calculating a deviation of said time interval indicative signal from a target time interval and generating a deviation indicative signal indicative of said deviation calculated; and means for updating said initial value in response to said deviation indicative signal whereby said operating signal generated thereafter is modified; and means for controlling engagement of the lock-up clutch in response to said operating signal.

7. A method for an adaptive control of a lock-up clutch in a hydrokinetic torque transmitting unit including a pump impeller coupled with an engine of a motor vehicle, and a turbine runner, the lock-up clutch being engageable to connect the turbine runner to the pump impeller, the method comprising the steps of:

detecting a revolution speed of the engine and generating an engine revolution speed indicative signal indicative of said revolution speed of the engine detected;

detecting a revolution speed of the turbine runner and generating a turbine revolution speed indicative signal indicative of said revolution speed of the turbine runner detected;

detecting a vehicle speed of the motor vehicle and generating a vehicle speed indicative signal indicative of said vehicle speed detected;

deriving an actual slip from said engine revolution speed indicative signal and said turbine revolution speed indicative signal and generating an actual slip indicative signal indicative of said actual slip derived;

generating an operating signal, said operating signal including an initial value and a term related to a difference between said actual slip indicative signal and a target slip value, the operating signal being generated after said vehicle speed indicative signal has exceeded a predetermined lock-up vehicle speed value;

urging the lock-up clutch to engage in response to said operating signal;

calculating a first time derivative of said actual slip indicative signal and generating a first time derivative indicative signal indicative of said first time derivative calculated;

determining whether said first time derivative indicative signal fulfills a predetermined condition;

counting a time elapsed after said vehicle speed indicative signal has exceeded said predetermined lock-up vehicle speed value until determination that said first time derivative indicative signal fulfills said predetermined condition and generating a time interval indicative signal indicative of said time counted;

calculating a deviation of said time interval indicative signal from a target time interval and generating a deviation indicative signal indicative of said deviation calculated; and updating said initial value in response to said deviation indicative signal whereby said operating signal generated thereafter is modified.

* * * * *

UNITED STATES PATENT AND TRADEMARK OFFICE
CERTIFICATE OF CORRECTION

PATENT NO. : 5,160,002
DATED : November 3, 1992
INVENTOR(S) : Yutaka SUZUKI

It is certified that error appears in the above-indentified patent and that said Letters Patent is hereby corrected as shown below:

ON THE TITLE PAGE

Item [22] "Nov. 3, 1991"
should read --April 8, 1991--.

Signed and Sealed this

Fifteenth Day of April, 1997

Attest:

BRUCE LEHMAN

*Attesting Officer*    Commissioner of Patents and Trademarks